United States Patent [19]

Schöbi

[11] Patent Number: 4,969,188

[45] Date of Patent: Nov. 6, 1990

[54] PROCESS AND APPARATUS FOR THE PROTECTION OF SECRET ELEMENTS IN A NETWORK OF ENCRYPTING DEVICES WITH OPEN KEY MANAGEMENT

[75] Inventor: Paul J. Schöbi, Zurich, Switzerland

[73] Assignee: GRETAG Aktiengesellschaft, Regensdorf, Switzerland

[21] Appl. No.: 152,101

[22] Filed: Feb. 4, 1988

[30] Foreign Application Priority Data

Feb. 17, 1987 [CH] Switzerland ............... 578/87

[51] Int. Cl.$^5$ .............................. H04L 9/32
[52] U.S. Cl. ........................ 380/23; 380/24; 380/25
[58] Field of Search ..................... 380/23–25, 380/45, 52

[56] References Cited

U.S. PATENT DOCUMENTS

| | | | |
|---|---|---|---|
| 3,764,742 | 10/1973 | Abbott et al. | 380/25 |
| 4,203,166 | 5/1980 | Ehrsam et al. | 380/25 |
| 4,211,919 | 7/1980 | Ugon | 380/23 |
| 4,295,039 | 10/1981 | Stuckert | 380/25 |
| 4,423,287 | 12/1983 | Zeidler | 380/24 |
| 4,467,139 | 8/1984 | Mollier | 380/23 |
| 4,471,216 | 9/1984 | Herve | 380/23 |
| 4,498,000 | 2/1985 | Decavele et al. | 235/380 |
| 4,578,530 | 5/1986 | Zeidler | 380/24 |
| 4,683,968 | 8/1987 | Appelbaum et al. | 380/45 |
| 4,910,773 | 3/1990 | Hazard et al. | 380/25 |
| 4,910,774 | 3/1990 | Barakat | 380/23 |

FOREIGN PATENT DOCUMENTS 0148960 7/1985 European Pat. Off. .

OTHER PUBLICATIONS

The American National Standard Publication "ANSI X9.17", 1985.
Federal Information Processing Standards Publication FIPS PUB 46-1, "Data Encryption Standard", Jan. 1977.
"Cryptography: A New Dimension in Computer Data Security", pp. 562–564, John Wiley & Sons, New York.

Primary Examiner—Salvatore Cangialosi
Attorney, Agent, or Firm—Burns, Doane, Swecker & Mathis

[57] ABSTRACT

Each encryption device of a communication network is divided into a base part and a security module in credit card form. The security module contains the functional stages required for the coding/decoding of the keys of lower hierarchical levels under keys of higher hierarchical levels and thus the secret elements of the network. The base parts contain no secret elements. The secret elements are stored in the security module preferably in a cryptologically secured form. A password also provided therein secures it against unauthorized use.

17 Claims, 3 Drawing Sheets

PROCESS AND APPARATUS FOR THE PROTECTION OF SECRET ELEMENTS IN A NETWORK OF ENCRYPTING DEVICES WITH OPEN KEY MANAGEMENT

BACKGROUND OF THE INVENTION

1. Field of the Invention

This invention relates generally to encrypting devices and more particularly to a process and apparatus for the protection of secret elements in a network of encrypting devices with open key management.

2. Background Description

Communication networks, which are widely used at the present time, require comprehensive cryptological protection. This gives rise to certain problems relative to key management, which seldom arose in the case of conventional point-to-point connections for the following reasons:

1. the networks are dynamic, i.e. the number of users constantly varies: old participants leave and new ones are entering, furthermore, the volume of the connections required (or permitted) is also variable; and 2. the open nature of the networks requires special measures for the identification of the users, as everyone may have access to the network.

In recent years, different possibilities of key management were proposed for such a situation. Methods are known, based on conventional (symmetrical) block encrypting algorithms, but public key methods were also used. In the following discussion, mainly the situation of conventional algorithms is described, in particular relative to certain embodiments; however, most of the inventive concepts may be extended to the public key situation.

The fundamental concept of conventional key management processes is based on the so-called "master key" principle. This signifies that a certain hierarchy of keys is established, so that certain keys (the lowest hierarchy level) are used for the data coding itself. The keys of the higher levels (master key) are used for the encrypting of "key management reports". These reports serve the transmission of new keys of a lower level.

A corresponding method was standardized by ANSI (ANSI X9.17). There exists also a proposed standard of ISO (ISO DP 8732) for a practically identical system. Here, a distinction is made between "data encrypting keys" (KD-s) and "key encrypting keys" (KK-s). In a typical application, at the onset of every new session (data transmission), a random KD is transmitted with the bilateral KK in an encrypted form and subsequently used for encrypting.

As the encrypting algorithm, DES ("Data Encryption Standard" according to FIPS Pub. 46, National Bureau of Standards, Washington DC, Jan., 1977) is being proposed in the standards. However, the methods also work with any other block encryptors in the same manner.

As further security, the standard specifies the use of "counters". These are counters, which on the one hand count the number of applications of a KK and on the other, alter this KK prior to its use (key offsetting). The devices should be designed so that any decrementation of the counter would be impossible. Processes are further provided, whereby the counters of two system participants may be synchronized. This results in that old reports stored earlier cannot be decoded with stolen devices, as in their case a lower counter value was used and decrementation of the counter is not possible.

FIG. 1 of the drawing shows schematically the operations required for the construction of a session according to ANSI X9.17. Blocks designated E symbolize an encrypting operation. Initially, the randomly produced KD data key, for example by means of a random generator, encrypted by using the key coding key KK, is transmitted. For this purpose, KK is altered first, using the associated counter (offsetted). The result of this operation is designated KKo (offsetted KK) and the encrypted data key with $E_{KKo}[KD]$. Subsequently, the data encrypted under KD are transmitted, the cipher being designated $E_{KD}$ (data). The receiver therefore first determines the KD by the inversion of the first operations and is then able to decipher the data.

In the design of a cryptological system, one of the principal problems is the question of what elements are to be protected against what type of access. If cost effective devices that are still secure are to be produced, on the one hand, the area to be protected must be kept as small as possible. On the other hand, the concepts must be selected so that relatively simple protective measures will suffice. Accordingly, there is a need for a key management system such that cost effective protective measures for sensitive elements become possible. The system should preferably be capable also of making possible the simple identification of users, or the use of access controls and permit directly the provision of a "key gun" for the distribution of KKs of the highest security (or hierarchy) levels. Accordingly, a suitable alternative is provided including features more fully disclosed hereinafter.

SUMMARY OF THE INVENTION

In one aspect of the invention this is accomplished by providing an encryption device for use in a network with open key management and with keys of different hierarchical levels, wherein keys are transmitted in an encrypted form under keys of higher hierarchical levels and wherein a security module is structurally and electrically separable from the device and in which functional stages and the keys are also located and stored, so that the device is free of secret elements The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

The invention is based on the use of an intelligent security module "token" with the following properties:

1. dimensions are small enough so that it may be carried comfortably by a person, (for example the token may be in the form of a so-called "smart card", i.e. a module equipped with electronic intelligence in a credit card format);

2. capability of storing information and maintaining it available over extended periods of time;

3. ability to perform encrypting operations;

4. functioning (for example its program) cannot be affected from the outside;

5. no possibility of simply reading out the information stored on the token; and 6. the token can be "sealed" with a password, in the sense that a password must be provided for its activation.

By means of this token, not only the fundamental object of the invention is attained, but a number of other advantages are obtained, to be set forth hereinbelow.

Remotely similar systems are described for example in C.K. Meyer et al, "Cryptography: A New Dimension in Data Security", pp. 652–564, John Wiley and Sons, New York, in U.S. Pat. No. 4,498,000 and in European Patent Application No. EP 0,148,960 A1. An important difference between the invention and the system of C.H. Meyer et al, consists for example in that with Meyer et al the security module is stationary and fixedly joined with the terminal (or host), while the security module according to the invention is mobile, i.e. may be separated from the base unit. U.S. Pat. No. 4,498,000 discloses a system which essentially provides identification for computer access "Bankomat". This does not involve the encrypting of data. In the system of EP 0,148,960 A1, a "validity module" is used in connection with data encryption. However, key management here is very different from that according to the invention. New session keys are calculated from old ones (on the module). There is no key hierarchy according to the invention.

The foregoing illustrates limitations known, to exist in present devices and processes. Thus, it is apparent that it would be advantageous to provide an alternative directed to overcoming one or more of the limitations set forth above.

BRIEF DESCRIPTION OF THE DRAWING FIGURES In the drawing.

DETAILED DESCRIPTION

Figure 1:
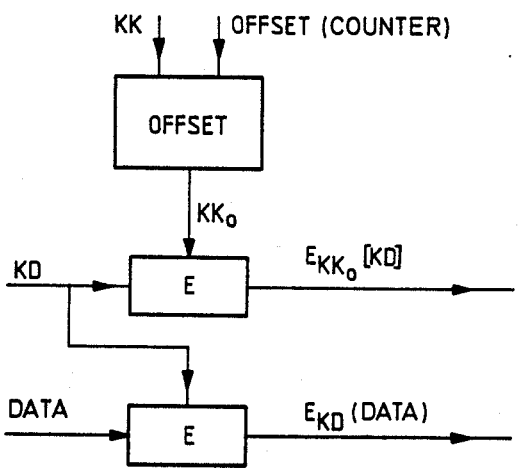
FIG. 1 is a diagrammatic view illustrating operations required for construction of a prior art session according to ANSI Standard X9.17.

The encryption device shown in the figures is in two parts. It consists of a basic part B designated the "base" and a security module T, designated a token and bodily and electrically separable from the base. For their connection with each other, the parts B and T are equipped with complementary interfaces 1 and 1' (for example in the form of galvanic contacts). Viewed as a whole, the encryption device shown fully corresponds to conventional encryption devices designed for operation according to the aforecited ANSI Standard X9.17. The invention therefore includes the novel parts B and T in such a conventional device.

The base part B comprises essentially a coding/decoding stage 2 and a random generator 3 to produce the data encryption key KD. The token T again contains essentially a coding/decoding stage 4, an offset stage 5, a counter 12 for the offset value and a memory 6 for (possibly several) key encryption keys KK. The counter is preferably implemented in software.

The rest of base part B corresponds to conventional devices of this type and requires no detailed explanation.

Figure 5:
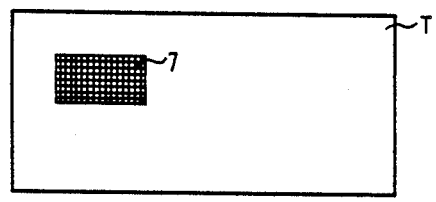
FIG. 5 is a schematic illustration of an embodiment of a security module (token) in accordance with the present invention.

Bodily, the token preferably has a credit card like configuration. An example is shown schematically in FIG. 5, wherein the area containing the electronics is designated 7. The electrical connection with the base part B may be effected for example in the known "smart cards" by means of galvanic contacts.

Figure 6:
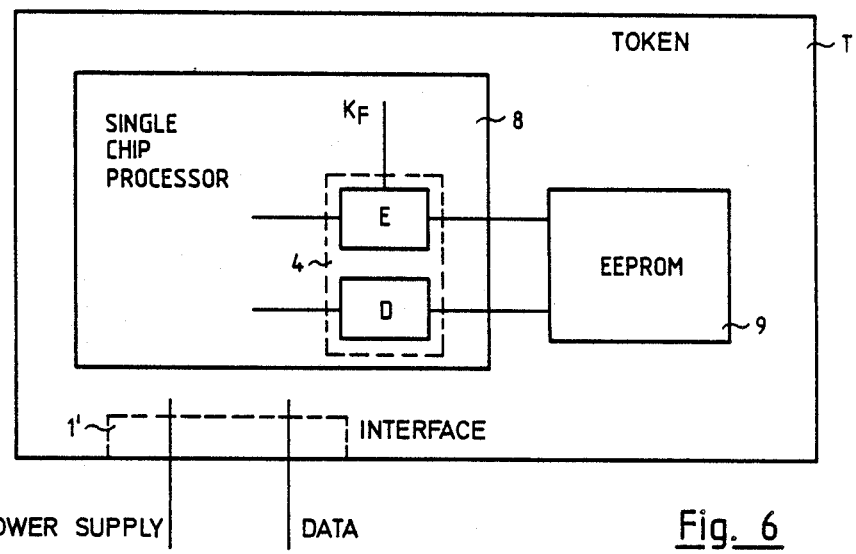
FIG. 6 is a diagrammatic illustration of an embodiment of the electrical layout of the token of FIG. 5.

The electronics required for the implementation of the necessary functions may be provided according to FIG. 6 preferably by a single chip processor (processor in the form of a single integrated circuit) 8 and a memory 9 in the form of an EEPROMS or battery buffered RAM-s. The memory may under certain conditions be located directly on the processor chip itself.

The "intelligence" of the token T is thus provided by the single chip processor (in combination with the memory). To render the readout of stored information impossible (for unauthorized persons) by simple means, the processor must be capable of being programmed so that on the one hand it cannot execute external program codes (commands), and that on the other hand the content of its internal memory (program and data) cannot be read from the outside by the application of electrical signals. If the nonvolatile memory 9, which must be relatively large and electrically erasable (e.g. for security reasons), is not contained on the same chip as the processor 8, its contents must be protected by a cryptological algorithm against readout and alteration. For this purpose, a special file key $K_F$ may be used, which is deposited in the (unreadable) memory of the single chip processor 8. In this layout any unauthorized reading of the information on the token requires the reading of the information on the processor chip (at least $K_F$). If the corresponding chip memory is provided in EPROM or EEPROM technology, this requires a relatively expensive technology and affords a degree of protection that is adequate in many cases (so-called "tamper protection").

The key encryption keys KK required for the encryption of the data encryption key KD, are produced by the device itself in a special device or possibly in the encryption device (base part) and stored together with the associated counter (the counter itself and contents) on the token with consideration of the aforedescribed protection aspects.

If now a connection between the two encryption devices is to be established, the token must be inserted with the KK-s required for connection into the encryption device (base part) used. For every session a random data encryption code KD must be produced and subsequently transmitted under KK (with a corresponding offset) in a coded form ($E_{KKO}$ [KD]). In the receiving encryption device the data encryption KD must be restored by the appropriate reversal of the operations from the cipher. The coding and decoding of the data encryption key KD takes place in the token and not in the base part. The encryption devices involved (the base parts, i.e., the devices without the token) therefore have access only to the data encryption key KD and not to the key encryption key KK involved. The necessary operations on the counter, i.e. for example the offsetting, are also effected automatically in the token.

Figure 2:
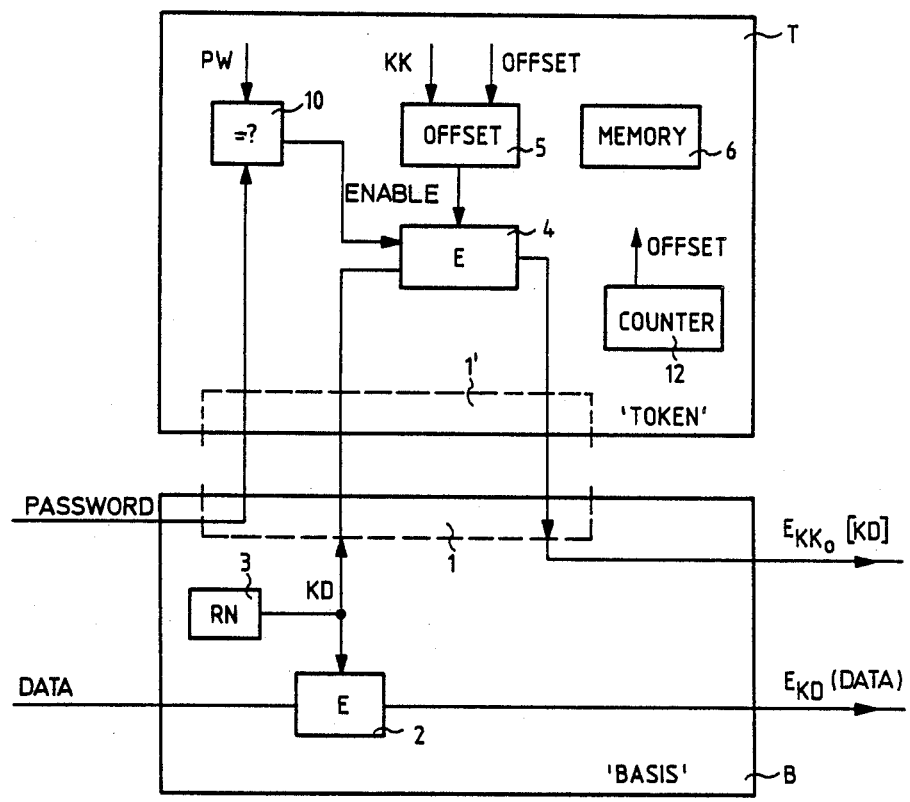
FIGS. 2 and 3 are diagrammatic illustrations of an embodiment of an encryption device of the present invention.
Figure 3:
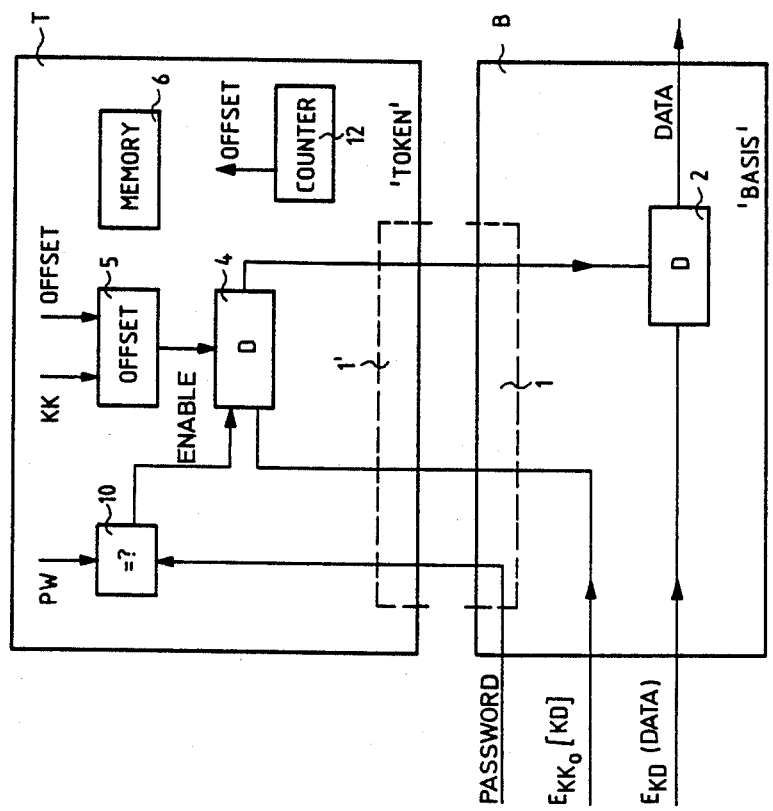

As indicated schematically in FIGS. 2 and 3, the token may also be equipped with a password system, which permits access to the key KK only if the user has inserted the correct password (by means of the base part). A comparator 10 compares the password inserted with the password PW stored in the token and releases or blocks as a function of the result of the comparison, for example the coding/decoding stage 4. This password system may obviously be conceived with any complexity desired.

Figure 4:
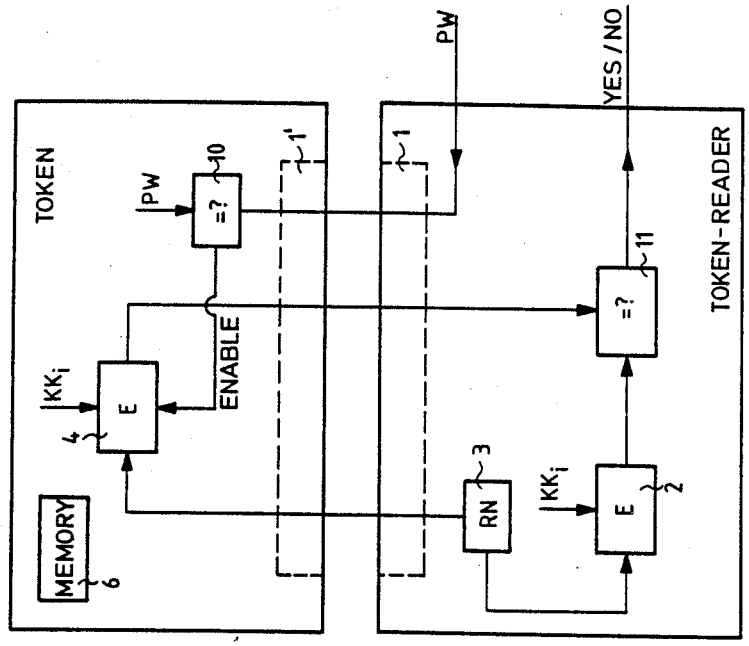
FIG. 4 is a diagrammatic illustration of an embodiment of an identification system in accordance with the present invention.

The aforedescribed system for the encryption of communications offers (with the password system) an implicit user identification, as only those owners of the token who know the correct and necessary password have access to the key KK required for the establishment of the connection. However, it is also possible to utilize the principle for explicit user identification, such as the example shown in FIG. 4.

The device shown therein consists of a base part B' designated a "token reader" and the known token T. The token again contains a coding stage 4, a password system 10 and a memory 6 for the key and the password (or passwords). The key used for identification here is generally designated $KK_i$. In the token reader, a random generator 3, a coding stage 2, a key memory 6' and a comparator 11 are present.

The system operates by the "challenged response method": following the activation of the token by the input of the correct password, the random generator 3 produces a random number RN, which is encoded in the coding stage 2 under the identification key 2 contained in the memory 6'. Simultaneously, the random number is transferred to the token and again encoded therein under the key $KK_i$ stored in the token. The encryption ($E_{KKi}$ [RN]) passes back into the token reader and is there compared by the comparator 11 with the encryption produced in the token reader. The result of the comparison is then signalled accordingly.

The token reader B' is not necessarily an independent device, but obviously may be integrated into an encryption system or provided in such a system. It is merely necessary, for example, to expand the base part B of the encryption system of FIGS. 2 and 3 by the comparator 11 and optionally the key memory 6'.

The security module (token) according to the invention may further be used directly for key distribution in the meaning of a so-called "key gun" (key distribution device). Keys to be distributed are deposited in the memory of the token and following the insertion of the token in the target encryption device (following the input of the password) transferred the device and the associated second token.

By the principle set forth above, of the division of the devices into a base part and a token, a number of protective functions are obtained. The storage of the key coding key KK (i.e. the really sensitive secret elements) in the token and the easily manipulated form of the token, make possible the removal of all sensitive elements following the use of a device. This signifies that the encryption devices contain no secret elements in their inactive state. It is therefore not necessary to protect them against unauthorized opening.

If the operation of an encryption device can be affected, for example by modifications of the hardware or the software, at the most, access to an instantaneous data key (KD) may be obtained. It is not possible to learn the KK used without analyzing the token.

The token is protected primarily in view of its small configuration, whereby it is readily safeguarded securely, for example on the person of the user.

The secret elements on the token are protected in a first stage by a password. Access without knowing the password would require technically difficult manipulations of the integrated circuit elements.

What is claimed is:

1. A process for the protection of secret elements in a network of encryption devices using key management and keys of different hierarchical levels, comprising the steps of:
    encryting information in a first encryption device under at least one key of a first hierarchical level; and,
    encrypting said at least one key of said first hierarchical level under a key of a second hierarchical level, wherein the encryption of the key of the first hierarchical level is effected in a security module which is separable from said first encryption device, and in which predetermined keys of the second hierarchical level are stored in an encrypted form.

2. The process according to claim 1, wherein the encryption under the key of a second hierarchical level in the security module is secured by a password system.

3. An encryption device for a network using key management with keys of different hierarchical levels, comprising:
    means for encrypting information under at least one key of a first hierarchical level;
    means for removably connecting said encryption device with a security module which is structurally and electrically separable from the encryption device and in which functional stages and keys of a second hierarchical level are located and stored, at least one key of said second hierarchical level being used to encrypt said at least one key of said first hierarchical level such that the encryption device does not contain all keys necessary for decrypting said information.

4. The device according to claim 3, wherein the security module contains a protecting password system.

5. The device according to claim 3, wherein the security module has a configuration similar to that of a credit card.

6. The device according to claim 4, wherein the security module has a configuration similar to that of a credit card.

7. The device according to claim 3, wherein information stored in the security module is stored at least partially in an encrypted form.

8. The device according to claim 3, wherein in the security module, a counter means is provided for the production of an offset value and a modification stage for key modification in keeping with said offset value.

9. A security module, in particular for an encryption device of a network using key management with keys of different hierarchical levels, said security module being a portable independent unit structurally and electrically interconnectable with an information encryption device, and containing functional stages and memories for encryption/decryption to information encrypting/decrypting keys fed thereinto from said information encryption device and for storing key encryption/decryption keys used therefore.

10. The security module according to claim 9, wherein the security module contains a protecting password system.

11. The security module according to claim 9, wherein the security module has a configuration similar to that of a credit card.

12. The security module according to claim 10, wherein the security module has a configuration similar to that of a credit card.

13. The security module according to claim 9, wherein information stored in the security module is stored at least partially in a an encrypted form.

14. The security module according to claim 9, wherein in the security module, a counter means is provided for the production of an offset value and a modification stage for key modification in keeping with said offset value.

15. The security module according to claim 9, wherein the security module provides for user identification.

16. The security module according to claim 9, wherein the security module provides for the storage and output of encryption keys to an encryption device and optionally to another security module.

17. A portable, independent security module for an encryption device of a network using key management with keys of different hierarchical levels, comprising:
  means for enabling physical and electrical disengagement of the security module from an encryption device, said encryption device using an information encrypting/decrypting key having a first key level to encrypt/decrypt information;
  means for storing a key encrypting/decrypting key having a second key level higher than said first key level;
  means for offsetting said key encrypting/decrypting key to create a modified key encrypting key;
  means for receiving said information encrypting/decrypting key from said encryption device; and,
  means for encrypting and decrypting said information encrypting/decrypting key using said modified key encrypting/decrypting key.

* * * * *